(12) United States Patent
Baig et al.

(10) Patent No.: US 9,191,361 B2
(45) Date of Patent: Nov. 17, 2015

(54) AUTHENTICATION METHOD FOR STATELESS ADDRESS ALLOCATION IN IPV6 NETWORKS

(71) Applicant: KING FAHD UNIVERSITY OF PETROLEUM AND MINERALS, Dhahran (SA)

(72) Inventors: Zubair Ahmed Baig, Dhahran (SA); Suli Charles Adeniye, Thukbah (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 555 days.

(21) Appl. No.: 13/685,590

(22) Filed: Nov. 26, 2012

(65) Prior Publication Data

US 2014/0149604 A1    May 29, 2014

(51) Int. Cl.
*H04L 29/12* (2006.01)
*H04L 29/06* (2006.01)

(52) U.S. Cl.
CPC ........ *H04L 61/2092* (2013.01); *H04L 61/6059* (2013.01); *H04L 63/0876* (2013.01); *H04L 63/1466* (2013.01)

(58) Field of Classification Search
CPC ............ H04L 63/0876; H04L 63/1466; H04L 61/2092; H04L 61/6059; H04L 61/2007
See application file for complete search history.

(56) References Cited

U.S. PATENT DOCUMENTS

| | | | |
|---|---|---|---|
| 8,112,803 B1 | 2/2012 | Satish et al. | |
| 2006/0029020 A1* | 2/2006 | Jung et al. | ..................... 370/331 |
| 2011/0019677 A1 | 1/2011 | Townsley et al. | |
| 2012/0128001 A1* | 5/2012 | Ooghe et al. | .................. 370/392 |
| 2012/0314624 A1* | 12/2012 | Asati | ................... H04L 61/1511 370/257 |
| 2013/0083347 A1* | 4/2013 | Perez et al. | .................. 358/1.14 |

OTHER PUBLICATIONS

Baig, et al., "A Trust-based Mechanism for Protecting IPv6 Networks against Stateless Address Auto-Configuration Attacks", Dec. 14-16, 2011, IEEE, p. 171-176.*
Rfc4862, "IP v6 Stateless Address Autoconfiguration", Sep. 2007. Network Working Group, 28 pages.*

* cited by examiner

*Primary Examiner* — Brian J Gillis
*Assistant Examiner* — Amy Ling
(74) *Attorney, Agent, or Firm* — Richard C. Litman

(57) ABSTRACT

The authentication method for stateless address allocation in IPv6 networks provides a P2P trust-verification approach for identifying a rogue node. Alternatively, the authentication method provides an information hiding scheme to avoid being plagued by rogue nodes. In both cases, the authentication method is embodied in a computer software product having machine readable code.

1 Claim, 12 Drawing Sheets

AUTHENTICATION METHOD FOR STATELESS ADDRESS ALLOCATION IN IPV6 NETWORKS

BACKGROUND OF THE INVENTION

1. Field of the Invention

The present invention relates to computer networking, and particularly to an authentication method for stateless address allocation in IPv6 networks.

2. Description of the Related Art

The idea of Internet Protocols was conceived in the mid-1970s at the Defense Advanced Research Projects Agency (DARPA) when there was a need for building a packet-switched network that would enable communication between dissimilar computer systems at research institutions. The Internet Protocol version 4 (IPv4), which had hitherto served as the core of the present Internet, was specified in RFC 791 and mainly functions to provide connectionless, best-effort delivery of datagrams through an Internetwork. It also provides fragmentation and reassembly of datagrams to support data links having different maximum transmission unit (MTU) sizes. The IPv4 is based on a 32-bit address format and associated packet structure.

Specified in the RFC 2460 and designed to address shortcomings in IPv4, the Internet Protocol version 6 (IPv6), the so-called "the next-generation Internet protocol," provides a more flexible and powerful framework upon which next generation network applications and services would be deployed. One of the main drivers for designing the new protocol was the shrinking of address space in IPv4, which was designed in the early 80's and had laid the foundation for the Internet. However, the IPv4 protocol was based on 32 bits and could only provide $2^{32}$ (or 4.3 billion) IP addresses, which is projected to be used up by Internet hosts in the next few years. While IP address conservation techniques, such as Network address translation (NAT) and Classless Inter-domain Routing (CIDR), have served the Internet community in prolonging the time when the whole address space would be fully consumed, analysts have argued that NAT operation is antithetical to the end-to-end principle of data transfer in the Internet. In addition, the NAT's philosophy does not encourage the proliferation of applications (such as P2P) that require that communication nodes are fully transparent to one another.

Some of the enhancements in the IPv6 over IPv4 are increased address space, mandatory security, and provision of stateless auto-configuration, a technique by which a new node forms its own address without the assistance of a DHCP server or manual configuration by a network administrator. Stateless address auto-configuration (SLAAC) works by the following sequence: (i) a node forms a link-local address; (ii) the node ascertains the uniqueness of its link-local address by performing duplicate address detection (DAD) check; (iii) the node obtains a network-prefix value from the neighboring routers; and (iv) the node forms its global-site local address from the network-prefix information obtained from router advertisements.

The node generates its link-local address by concatenating its link-local prefix FE80/64 bits with its 64-bits interface ID. The 64-bit interface ID is generated from the node's 48-bit MAC address by inserting a 16-bit 'FF-FE' string between the third byte and the fourth byte and then setting the uniqueness bit (the uniqueness bit is the second bit of the leftmost octet, and it identifies the distinctiveness of the MAC address—it is typically set to 1 if the MAC address is unique). For instance, an IPv6 node with a MAC address 00-12-6B-3A-9E-9A would create a temporary link-local address by inserting FF-FE in the middle of the 48-bit MAC address and setting the uniqueness bit to give an interface ID of 0212:6BFF:FE3A:9E9A, and then concatenating the link-local prefix with the interface ID, which results in a link-local address of FE80::0212:6BFF:FE3A:9E9A. In order to confirm that the assigned link-local address is unique, and hence the usability of the address on the local link, the node undergoes a duplicate address detection process by sending a message to the corresponding solicited-node multicast address. This solicited-node multicast address is formed by concatenating a fixed leftmost of 104 bits with 24 bits that is taken from the rightmost part of the link-local address.

Thus, the solicited-node multicast address for FE80::0212:6BFF:FE3A:9E9A is FF02::1:FF3A:9E9A. If there is a neighbor advertisement (NA) response to this neighbor solicitation message, this indicates that the link-local address is already in use by another node and cannot be used by the soliciting node. Duplicate addresses should not be experienced very often during the auto-configuration process, since the interface identifier, which forms part of the address, is obtained from a unique MAC address. However, if the IPv6 node does not get a neighbor advertisement message in response to its neighbor solicitation message, it proceeds to obtain network-prefix information by sending a router solicitation (RS) message to all the routers on its link on the destination multicast address FF02::2. The router advertisement (RA) containing the network prefix is sent by the routers (for example, with a prefix 3FFE:A00:1::/64 in the source address) to the all-nodes multicast FF02::1 (all-nodes multicast address). Thus, the new node can form its globally-unique address by appending the network-prefix information to its interface identifier. The globally-unique address can be used by the node to communicate on the Internet.

While the aforementioned stateless address auto-configuration (SLAAC) approach allows instant plugging in of a node, guarantees immediate communication with other nodes, and eliminates the costs of procuring and maintaining DHCP servers, it opens up ways for malicious nodes in the network to disallow many upcoming nodes from initializing their network interfaces, a form of denial of service. Other security implications include the potential for duplicate address detection attack, Man-in-the-middle attack, Sniffing, bogus-on-link prefix attack, and parameter spoofing attack.

Thus, an authentication method for stateless address allocation in IPv6 networks solving the aforementioned problems is desired.

SUMMARY OF THE INVENTION

The authentication method for stateless address allocation in IPv6 networks provides a P2P trust-verification approach for identifying a rogue node. Alternatively, the authentication method provides an information hiding scheme to avoid being plagued by rogue nodes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The authentication method for stateless address allocation in IPv6 networks provides a P2P trust-verification approach for identifying a rogue node. Alternatively, the authentication method provides an information hiding scheme to avoid being plagued by rogue nodes. Both embodiments exploit the Unicast, Anycast, and Multicast forms of addresses in the IPv6 protocol. The present method utilizes a trust algorithm for solving stateless address auto-configuration attack in IPv6 networks. Alternatively, the present method provides an MSS/LSS (Information hiding) algorithm for solving the stateless address auto-configuration (SLAAC). Portions of the trust algorithm are described in Z. A. Baig and S. C. Adeniye, "A trust-based mechanism for protecting IPv6 networks against stateless address auto-configuration attacks", Networks (ICON), Dec. 16, 2011, 17th IEEE International Conference on, pgs. 171-176, which is hereby incorporated by reference in its entirety.

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the invention. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

Figure 1:
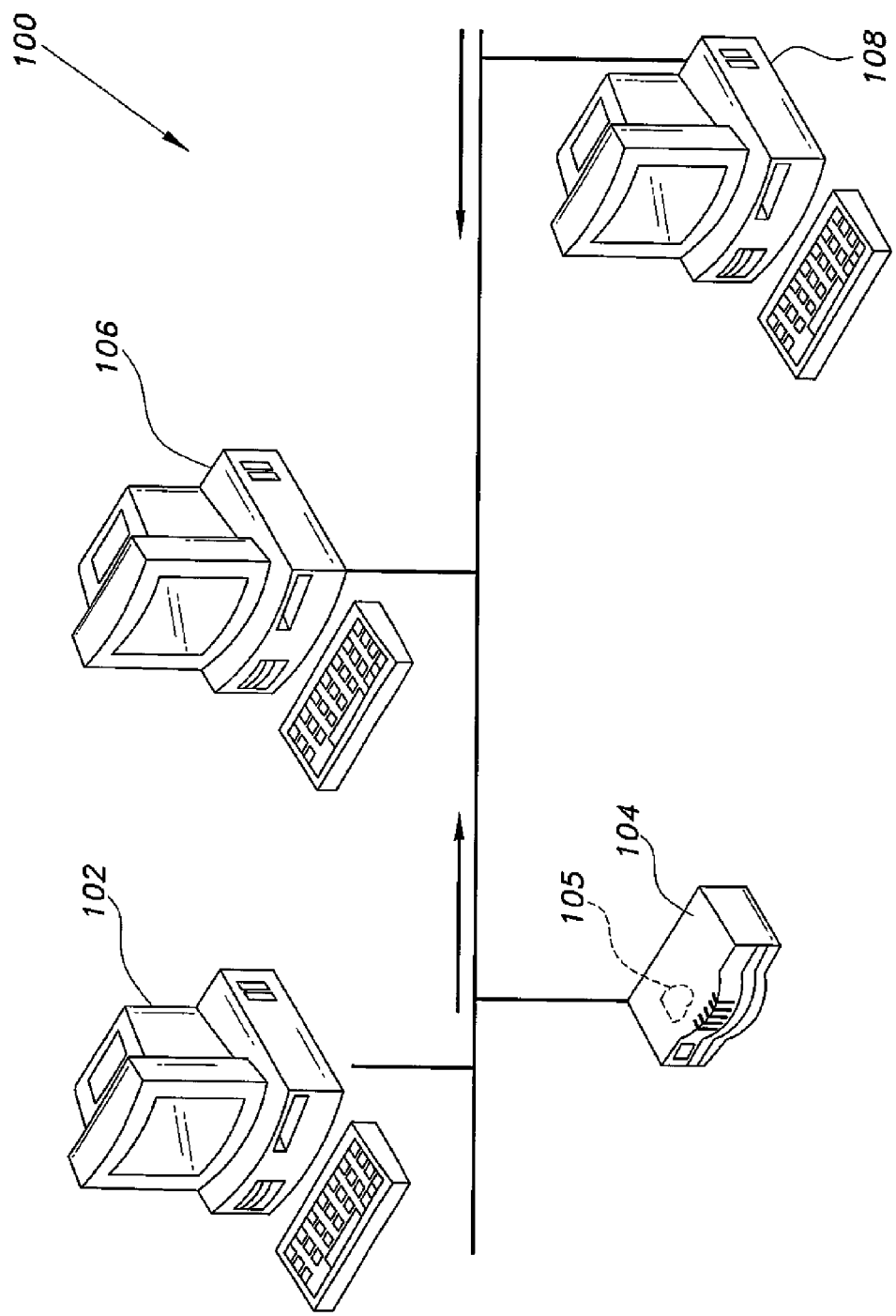
FIG. 1 is a block diagram of the networking system of an authentication method for stateless address allocation in IPv6 networks according to the present invention

As shown in FIG. 1, the present method may be embodied in a software product 105 having computer executable code that can run in a router 104 within a network system 100 to detect and avert an attack from a malicious node 102 targeted at neighbor nodes 106 and 108.

Peer-to-peer network is a type of network architecture in which a peer can act as a server and a client. The peer can provide service, and can also make a request for service from other peers. In addition, there is no central authority or infrastructure that coordinates the behavior of peers. Further, each peer makes autonomous decisions based on information received from its neighbors, and a peer can join or leave the network as it pleases. Because of this dynamic and autonomous nature of the P2P model, it is a great success in the Internet community, as Internet applications, such as instant messaging, distributed processing and file sharing, are built on top of the peer-to-peer communication model.

The stateless address auto-configuration technique of forming addresses in IPv6 networks also supports this communication paradigm, since new nodes intending to initialize their interfaces do not need to contact a server for address information. A new peer forms a temporary address (i.e., a link-local address) and goes through the duplicate address detection process to ascertain the usability of this address. The platform of our work is, therefore, peer-to-peer. Despite all these great features of the peer-to-peer communication model, there are a number of security concerns that threaten its success. First, since no peer has the power or duty of monitoring and restraining other peers' behavior, and second, since each peer is anonymous and interactions in a P2P network take place between stranger peers, this may lead some peers to decide to render malicious services, such as sending unreal or fake information, and colluding with other peers to provide bad service.

A malicious node or set of malicious nodes in an IPv6 networks may also frustrate the stateless address auto-configuration process if they always respond with a network advertisement message to a network solicitation message of an upcoming node. The new node may give up initializing its interface after a few other attempts at forming new link-local addresses and performing the duplicate address detection. One technique that we propose to deal with the stateless auto-configuration threat in IPv6 network is Trust and Reputation.

The embodiments of the present method rely on network trust properties, including Transitivity, i.e., when peer A trusts in peer B, A should also trust B to make recommendations about other peers C, D, etc.; and Composability—when peer A receives a number of recommendations about peer B from other peers, peer A should be able to combine all of the trust values in the received recommendations into a single belief (trust value) about B's trustworthiness. For instance, if peer A receives recommendations about peer B from other peers 1, 2, 3 . . . k, then the combined trust value of B in A is:

$$\text{Trust } degree_{AB} = \frac{1}{k}\sum_{i}^{k} \text{Trust } degree_{iB} \quad (1)$$

and if each of the peers i has different weights w in A, then the trust value can be:

$$\text{Trust } degree_{AB} = \frac{1}{k}\sum_{i}^{k} w_i \cdot \text{Trust } degree_{iB} \quad (2)$$

where $w_i \geq 0$ and $w_i$ is the weight that peer A attaches to each of the recommendation trust values from peer i, where $\Sigma w_i=1$. Asymmetry represents the fact that just because peer A trusts another peer B, that does not mean peer B would trust peer A, with the same trust value in both directions. Context Sensitivity represents the fact that Trust is a function of a specific context. Peer A may trust peer B on very good file quality, but may not trust recommendations from B about another peer C.

The present networking method is based on distributed definition and confirmation of address uniqueness, and does not affect the flexibility provided by the address auto-configuration property of the IPv6 protocol. A new node joining an IPv6 network forms its link-local address from the concatenation of its interface identifier and link-prefix and attempts to confirm the usability of the link-local address by sending a multicast neighbor solicitation (NS) message (the NS message contains the link-local address) to all the nodes on the local link. If there is no neighbor advertisement (NA) response to the new node's NS message, this implies that its link-local address is unique and it can proceed to form a global address using its link-local address. However, if there is a neighbor advertisement response from a node inside the network, the new node first extracts the IP address of the responding node from the neighbor advertisement message and then proceeds to verify the claim of the responding node by finding out its trust value from its neighbors. This new node does this by sending a second neighbor solicitation message containing the IP address of the claiming node (responding node) to all the neighbors of the responding node, requesting for its trust value in the network. The new node establishes the trustworthiness of the claiming node by extracting the claiming node's trust value from each of the neighbor advertisement responses and computing the aggregate trust value, which the new node compares to a certain trust threshold.

For the present trust scheme, each node i in the network is assumed to have a list of k neighbors, where the value k and the exact neighbor list is randomly selected and defined at network initialization time. The neighbor list for a given node i includes all nodes that can confirm the existence of a link-local address (LLA) in the network, if an advertised LLA request by an upcoming node (e.g., w) is considered in use, based on an incorrect response received from a malicious node operating network. The following Table 1 lists parameters used by the present method:

TABLE 1

| Parameter | Definition |
| --- | --- |
| Parameters used | |
| $k_i$ | The number of trusted neighbors of an existing IPv6 node i, where i is the node ID. |
| $\Theta$ | The threshold on the minimum number of neighbor responses needed for node address verification. |
| $T_{i \to j}^e$ | The trust value between a node pair $\{i, j\}$ during a given time epoch e. |
| N | The total number of nodes in the network. |
| y | The number of legitimate nodes in the network. |
| N − y | The expected number of rogue nodes. |
| $\alpha$ | The trust factor. |
| $\tau$ | The optimal time window length. |

The trust factor $\alpha$ is derived from the number of responses (network advertisement messages) received from k neighbors of a given node i, when a network solicitation message is sent. The value of $\alpha$ depends on the window of time (which is a function of the network size, number of hops and approximate round-trip delay), where $\alpha \in \{0, 1\}$. Based on the dependencies defined, the decision factor, given by $G_{i \to j}$, enables a requesting node to determine whether to trust a response (NA) coming from a node j, or not, and is provided by Equation (3):

$$G_{i \to j} = \alpha \cdot T_{i \to j}^e + \frac{\alpha}{(N - y) \cdot \tau} \quad (3)$$

If $G_{i \to j} > \Theta$, node i trusts j, else it does not trust node j and starts afresh forming a new link-local address and sends another network solicitation message.

In order to find the optimal window of time within which the k trustable responses (NA) need to be received by the sender i, the differential of equation (3) is equated to zero. Equation (4) best provides the maximized value of $\tau$ to attain the maximum trust within a window of time of length $T_{i \to j}^e$:

$$\tau = \frac{1}{\sqrt{y \cdot (N-y) \cdot T_{i \to j}^{e}}} \quad (4)$$

Figure 2:
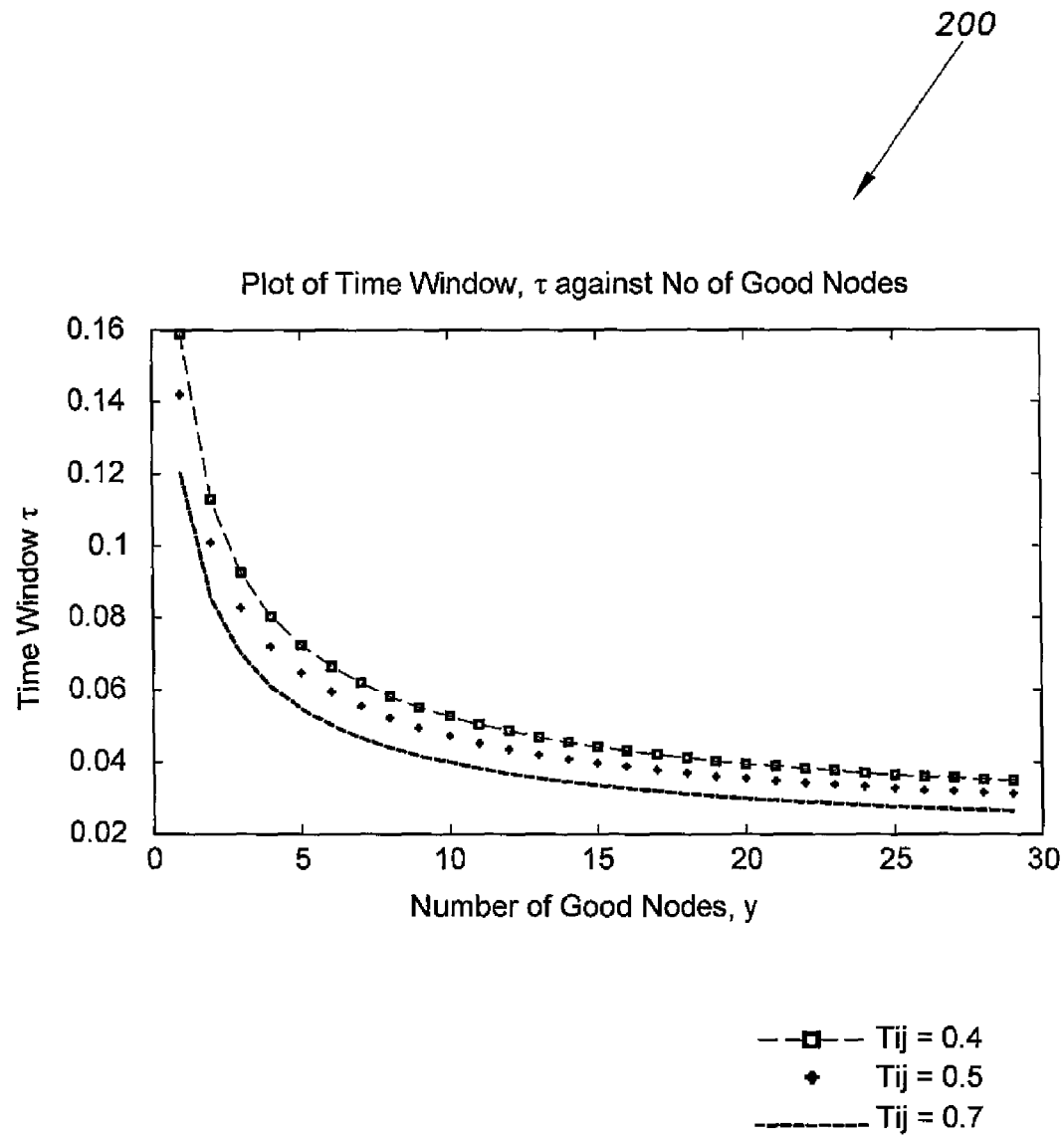
FIG. 2 is a plot showing time window vs. number of good nodes in an authentication method for stateless address allocation in IPv6 networks according to the present invention.
Figure 3:
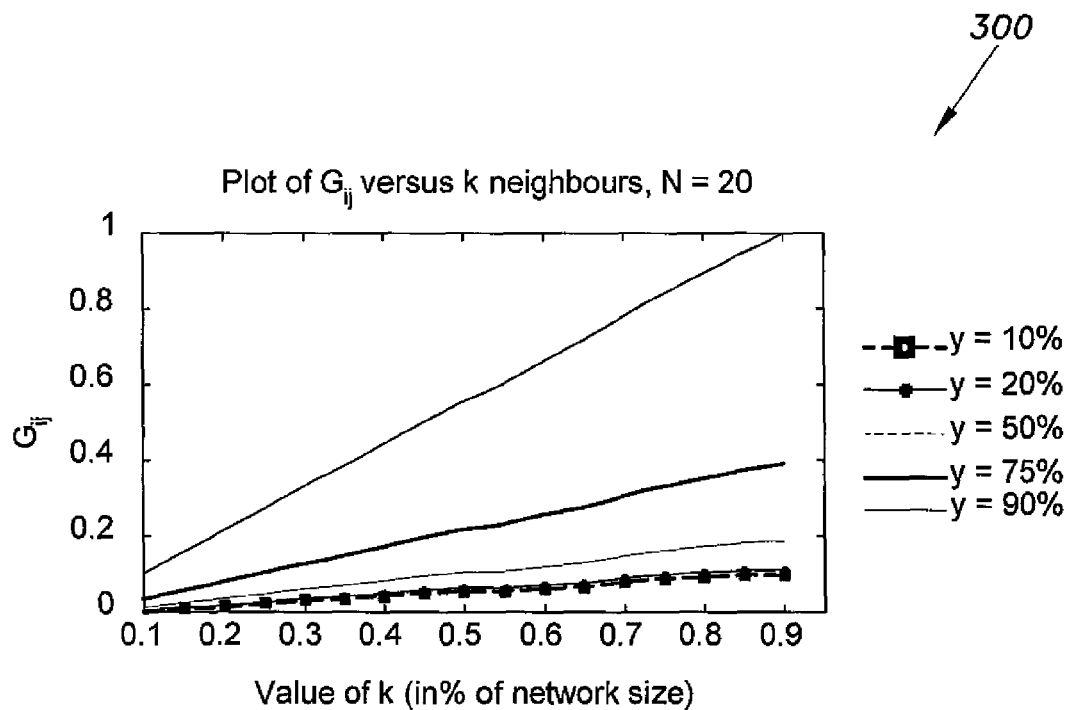
FIG. 3 is a plot showing G vs. k neighbors with N=20 in an authentication method for stateless address allocation in IPv6 networks according to the present invention.
Figure 4:
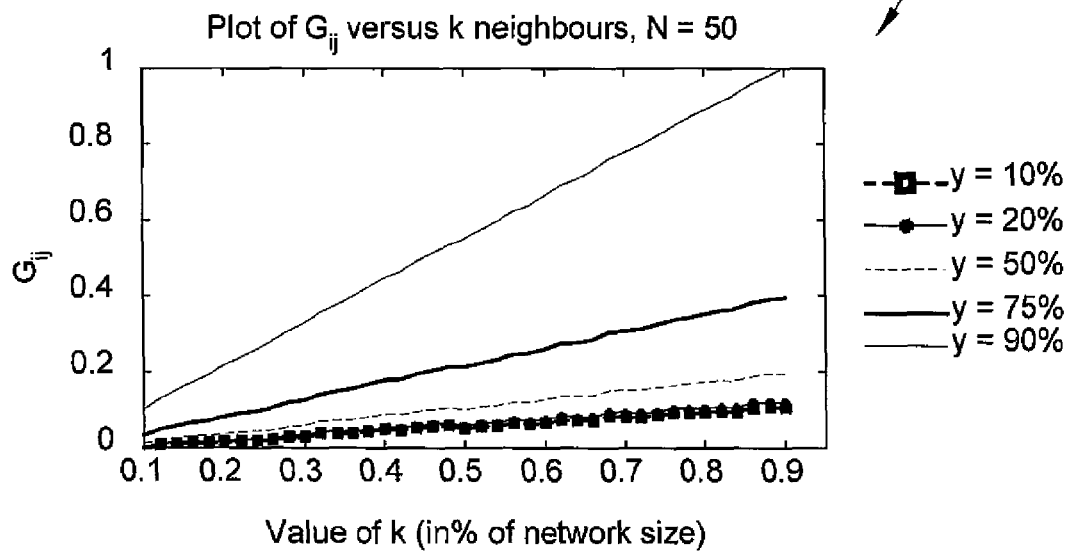
FIG. 4 is a plot showing G vs. k neighbors with N=50 in an authentication method for stateless address allocation in IPv6 networks according to the present invention.
Figure 5:
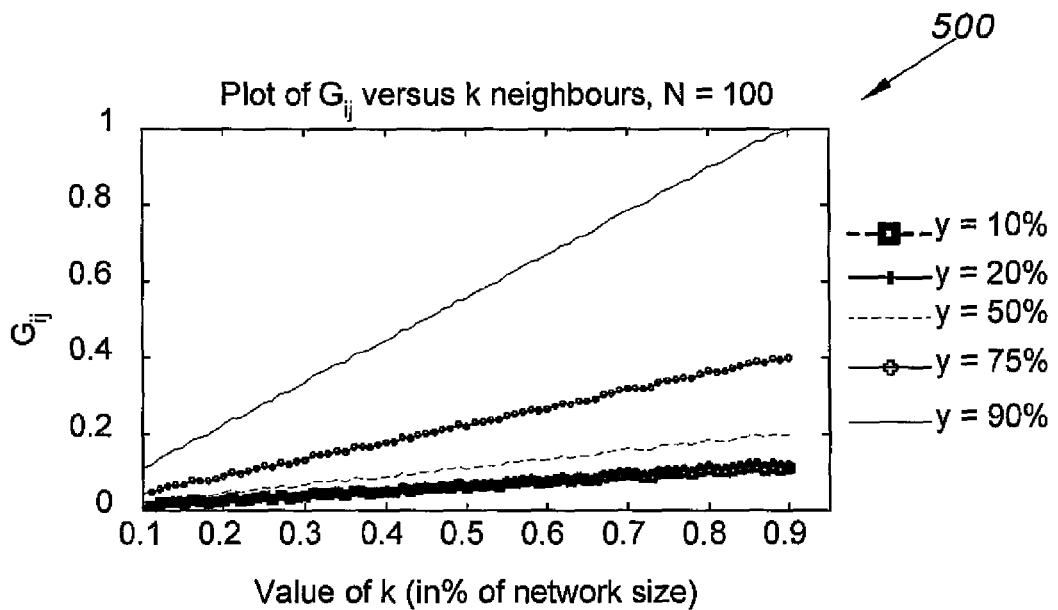
FIG. 5 is a plot showing G vs. k neighbors with N=100 in an authentication method for stateless address allocation in IPv6 networks according to the present invention.
Figure 6:
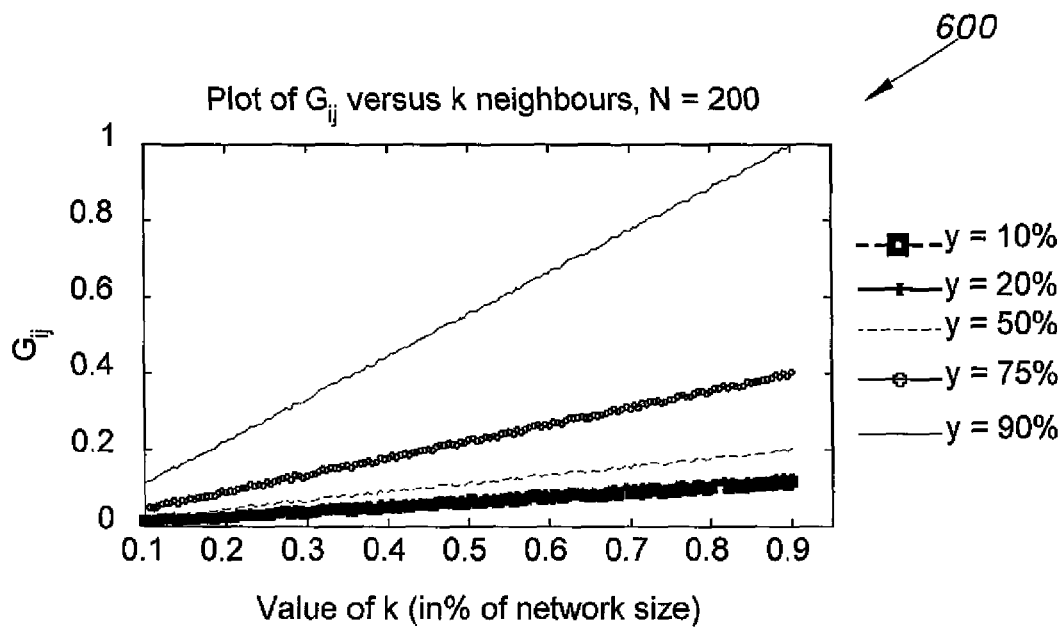
FIG. 6 is a plot showing G vs. k neighbors with N=200 in an authentication method for stateless address allocation in IPv6 networks according to the present invention.
Figure 7:
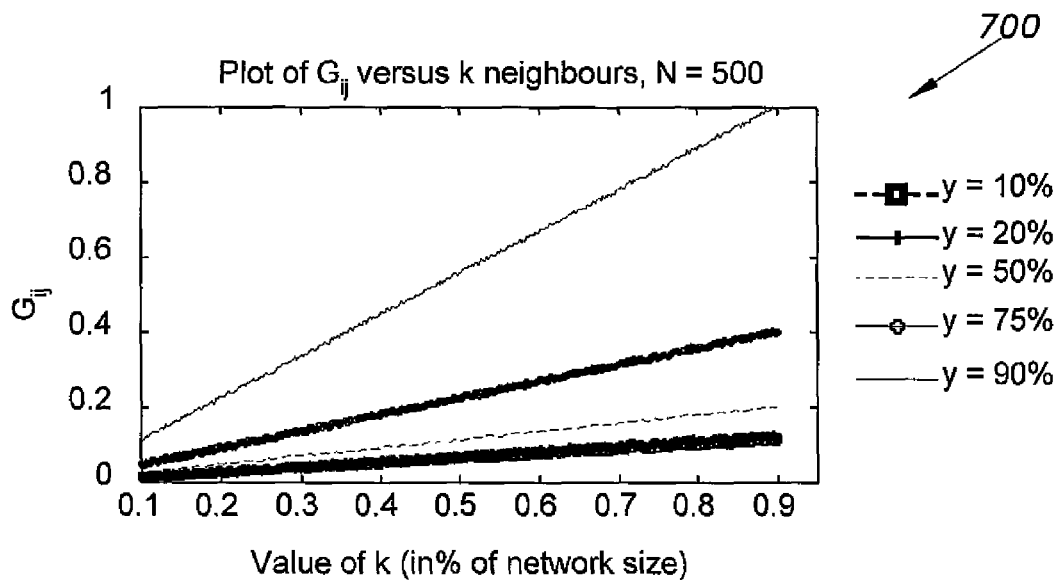
FIG. 7 is a plot showing G vs. k neighbors with N=500 in an authentication method for stateless address allocation in IPv6 networks according to the present invention.
Figure 8:
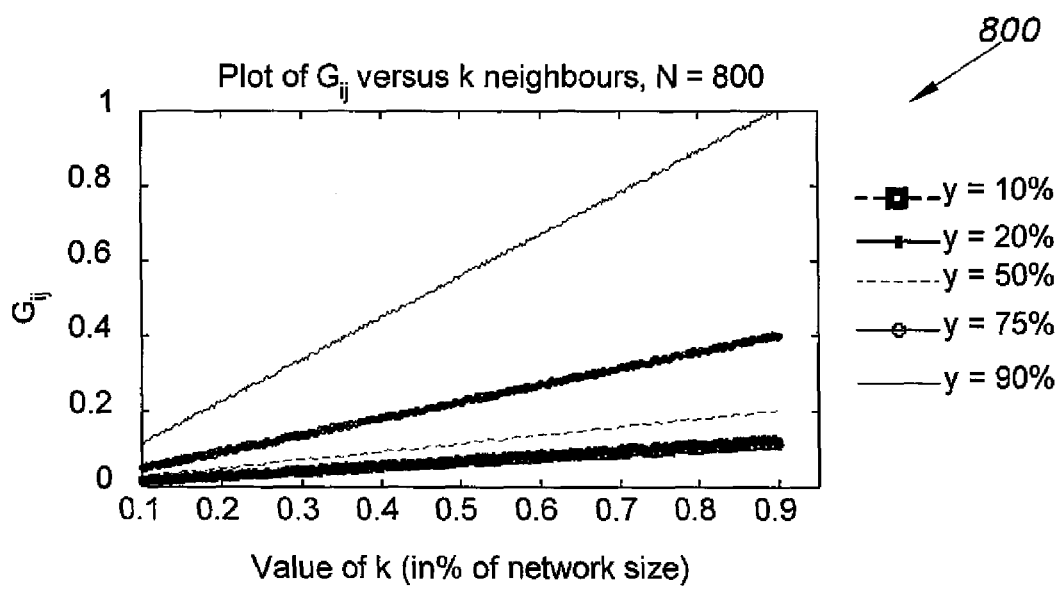
FIG. 8 is a plot showing G vs. k neighbors with N=800 in an authentication method for stateless address allocation in IPv6 networks according to the present invention.
Figure 9:
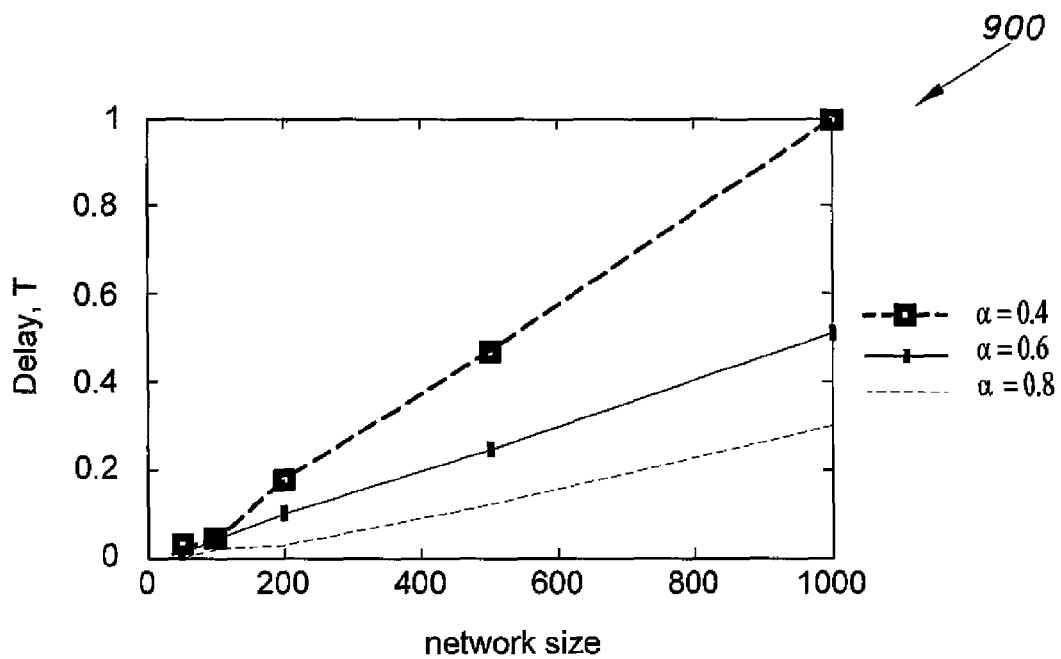
FIG. 9 is a plot showing delay vs. network size with first address verification scheme in an authentication method for stateless address allocation in IPv6 networks according to the present invention.
Figure 10:
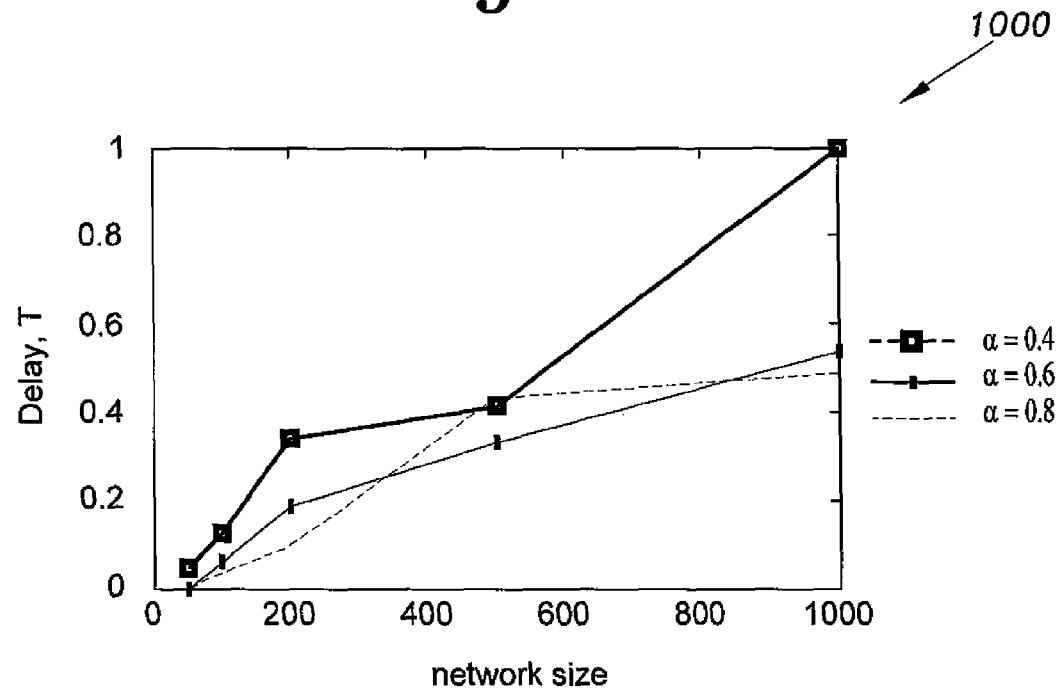
FIG. 10 is a plot showing delay vs. network size with second address verification scheme in an authentication method for stateless address allocation in IPv6 networks according to the present invention.
Figure 11:
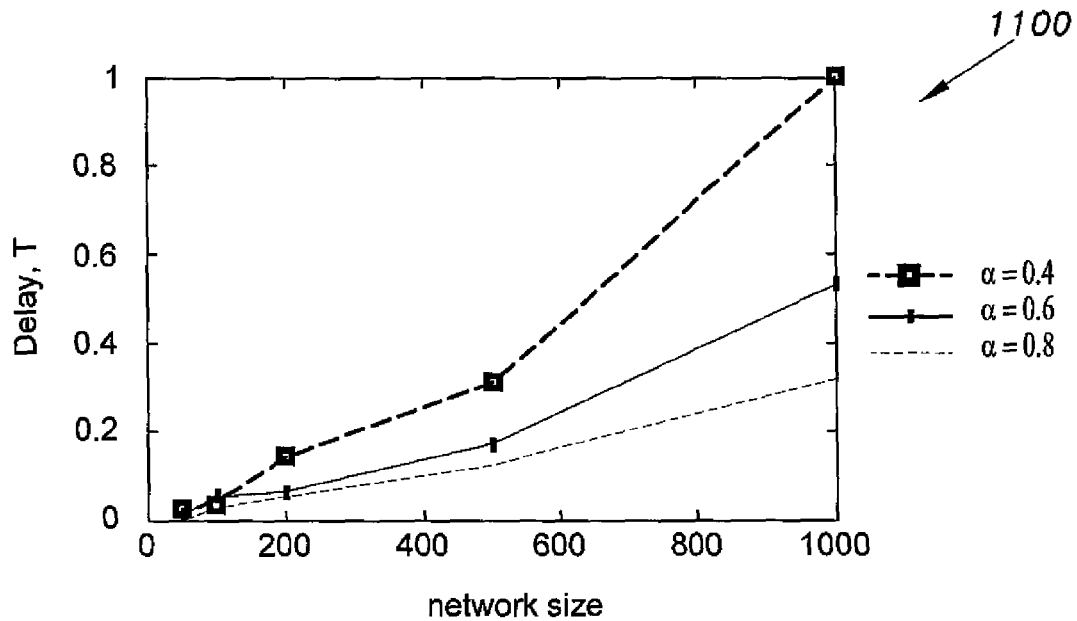
FIG. 11 is a plot showing delay vs. network size with third address verification scheme in an authentication method for stateless address allocation in IPv6 networks according to the present invention.
Figure 12:
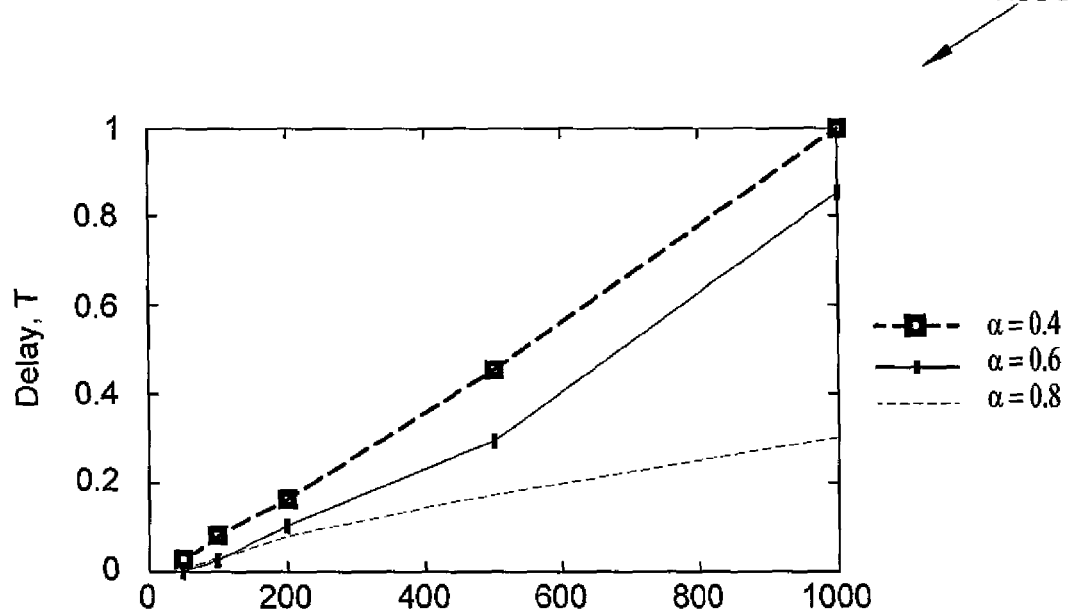
FIG. 12 is a plot showing delay vs. network size with fourth address verification scheme in an authentication method for stateless address allocation in IPv6 networks according to the present invention.

As shown in plot 200 of FIG. 2, the time window ($\tau$) within which an upcoming node i can expect a valid and verified response to its network advertisement (NA) message decreases with an increasing number of good nodes y in the network. Algorithm 1, detailed in Table 2, illustrates the steps of execution of the trust-based address verification scheme. The steps of the algorithm are executed based on a response received to a new node address uniqueness request in the network.

TABLE 2

Proposed Trust Algorithm 1
ACTION
Trust Based Address Verification

```
// Determine the optimal value of τ
foreach NewNodeLLARequest do
    Address multicast: n → N
    foreach Neighbor_k^n do
        DetermineTrust_k^n
    end
    foreach Neighbor_k^n do
        if G_{i→j} > Θ, then
            T_{i→j}^e = 1
        else
            T_{i→j}^e = 0
    end
end
```

Basically, a new node attempting to join a network forms its link-local address via stateless address auto-configuration and tries to verify its address uniqueness by multicasting a NewNodeLLARequest (corresponding to neighbor solicitation message) to all nodes on the local link. If there is no response, the new node goes ahead to use its address. If there is a response, the new node sends another NewNodeLLARequest message to all the k neighbors of the responding node. The new node uses $\tau$ as the time window within which it expects a response to the NewNodeLLARequest message. From the response to the second NewNodeLLARequest message, the new node extracts the trust information of the claiming node from its k neighbors, computes the aggregate trust value, and then compares it with a certain threshold. With this, the new node can ascertain if the claim of the responding node is genuine or not.

The simulator for testing the effectiveness of our proposed trust-based attack detection mechanism was written in MATLAB. The parameters defined for the scheme above were varied and their corresponding effects on the outcome of the simulations were analyzed.

Plots 300 to 800 of FIGS. 3 to 8, respectively, provide insight into the effect of increasing the number of trusted neighbors in the network on the trust factor $G_{i \to j}$, and of varying the number of trusted nodes in the network, i.e., values of y. Each plot represents a network of a different value of N, namely, 20, 50, 100, 200, 500 and 800. A new node in an IPv6 network goes ahead with using its LLA if there is no neighbor advertisement response to its neighbor advertisement request containing the temporary address. However, if there is a response, the node depends on the trust value $G_{i \to j}$ generated by any node i in the network willing to perform address verification on behalf of the new node. With increasing numbers of legitimate nodes in the network, there is a lesser chance for a malicious node to influence the trust value in the network advertisement message exchanged in the network, and thus the requesting node could reliably accept the trust value issued by the resolving node i.

As observed from the plots, the effect of increasing network size on the scheme is negligible, thus attesting to the scalability of the present method. Plots 900-1200 of FIGS. 9-12, respectively, illustrate the delay experienced by the network advertisement messages, based on the network size. The general trend in the plots is that as the number of nodes in the network increases, so does the delay. This occurs because of the increasing number of messages exchanged in the network with an increasing number of nodes for a fixed value of k=10%.N. Similarly, the size of the network has a direct relationship on the number of hops, and as such, delays are higher in 500-node and 800-node networks, when compared with smaller networks. However, as the trust values in the messages exchanged in the network increase (i.e., caused by the higher proportion of good nodes), the delay experienced by the messages is less. Therefore, an increasing value of $\alpha$, has a corresponding effect on the delay incurred. This occurs because with a higher number of legitimate nodes in the network, the neighbor list, consisting of k neighbors for each node i, will include nodes in close proximity to i. As a result, the performance of the scheme is seen to improve with increasing values of $\alpha$. It may be noted that the value of $\alpha$ is directly proportional to the number of legitimate nodes y in the network.

A trust-based approach has been presented that enables a new node with stateless auto-configured address attempting to join a network to detect a malicious claim by a rogue node that tries to claim ownership of the new node's address. The new node achieves this by getting the trust information of the rogue node from its neighbors, and then computing the aggregate trust information of the rogue node.

The scheme assumes that every k neighbor of a node i in the network is trustworthy, and as a result, the new node can assume that the trust information it is getting from the neighbor advertisement message for a node is true. However, in the presence of several colluding nodes, i.e., when the some or all of the k neighbors of a node are malicious, the scheme could fail, since a malicious node would never be detected by the new node that is trying to verify the claim of the malicious node.

An alternative embodiment of the present method is based on the fact that IPv6 protocol introduces a new auto-configuration technique by which nodes could initiate their interfaces in a network without the need of a static configuration by an administrator or by using a DHCP server. The node forms an address combining information from routers inside a network, and that from its physical address. In the process of ascertaining the usability of this address, malicious nodes inside the network could subvert this auto-configuration mechanism if they continue to respond with a network advertisement message portraying that the address formed by the new node is in use.

The alternative authentication method utilizes an MSS/LSS procedure which uses the last 24 bits of a new node LLA to ease the process of node address verification and to contain any malicious node that may attempt to frustrate the auto-configuration technique.

With respect to this novel authentication method, an unspecified Address is a reserved address value that indicates the lack of an address (i.e. the address is unknown). It is never used as a destination address, but may be used as a source address if the sender does not (yet) know its own address (for instance, when verifying an address is unused during stateless address auto-configuration). The unspecified address has a value of 0:0:0:0:0:0:0:0 or ::.

A Link-local Address is a unicast address having link-only scope that can be used to reach neighbors. All interfaces on routers must have link-local address. Interfaces on hosts are also required to have a link-local address.

Address Auto-configuration and Address Resolution are defined as follows. Address auto-configuration introduces the mechanisms needed in order to allow nodes to configure an address for an interface in a stateless manner, while Address Resolution is used by a node to determine the link-layer address of an on-link destination (e.g., a neighbor) given only the destination's IP address.

Duplicate Address Detection (DAD) is a mechanism that allows a node to determine whether or not an address it wishes to use is already in use by another node.

Regarding EUI-64 and the neighbor discovery protocol, when sending a packet from a node A to another node B, and given that the host part of an address embeds the MAC address, a node A might just extract the MAC address from the IPv6 address of the destination B, and then use the MAC address as the destination layer 2 frame address. This would avoid the need for the neighbor solicitation and advertisement process and the duplicate address detection, and it would be faster. However, a source node may not want to do this because of the fact that a node having an address that looks like an EUI-64 does not necessarily mean that the MAC address is there. Moreover, some link-layers do not have unique MAC addresses. Additionally, there is not necessarily a one-to-one relationship between the MAC and the IPv6 address. Nodes are also using manually assigned addresses or temporary addresses that have no EUI-64 part. These addresses must use neighbor discovery. It is safer to implement this mechanism for all addresses to avoid duplicate addresses on the same link. The cost of initial neighbor solicitation/advertisement exchange is low compared to the safeguard it provides. If multiple addresses on the same interface use the EUI-64 from the same MAC addresses, implementation can choose to make the neighbor solicitation only on the first one and skip for others, increasing the efficiency of the neighbor solicitation and advertisement process.

The present authentication method for stateless address allocation in IPv6 networks utilizes an MSS/LSS technique for stateless address auto-configuration attack detection. The present authentication method uses only the last 24 bits (corresponding to the last 6 hex letters) of a link-local address for verification. In this scheme, the new node does not send its newly formed link-local address inside the payload of a network solicitation message during the duplicate address detection stage. Rather, it only sends a part of its link-local address string and tries to find out which of its neighbor peer nodes shares this string in their link-local address. The ending 24-bit string of the new node's address is, however, divided into the most significant segment (MSS) and the least significant segment (LSS). The new node inserts the LSS into the payload of the neighbor solicitation message and multicasts the NS message to all the nodes on the link, during the duplicate address detection stage, asking any of these nodes whose last part of its LLA address tallies with the LSS to send their full IP address when responding with their neighbor advertisement messages.

TABLE 3

Neighbor Solicitation Message

| Source MAC | Source IP | Destination MAC | Destination IP | Payload |
|---|---|---|---|---|
| — | :: (unspecified address) | — | All-node multicast address | LSS of the last 24 bits of its LLA |

As shown in Table 3, in the NS message, both the Source MAC and the destination MAC fields are empty. The destination MAC field is empty, since the message is being sent to all the existing nodes in the network, so no specific IPv6 node is targeted—the target is all the nodes on the local link. The Source MAC field is empty because the new node does not want any existing node to guess its IP, since the link-local address is typically derived from the MAC address. The source IP address field is unspecified (::), since the new node has not validated its newly formed address. The format of neighbor advertisement is as shown in Table 4.

TABLE 4

Neighbor Advertisement Message

| Source MAC | Source IP | Destination MAC | Destination IP | Payload |
|---|---|---|---|---|
| Link layer address of responding node | Link local address of responding node. | — | All-node multicast address (ff02::1) | Its LLA |

In the NA message, the destination MAC field is empty when the NA message is also being sent to all the nodes on the local link.

Upon receipt of an NA, or a number of NAs, to its NS message, the new node checks the source IP fields of the NAs to see if any of them matches with its own. If there is no match, the new node goes ahead to use its address. Otherwise, it sends another NS message with different payload information.

The number of bits inside the LSS string, in, is varied by the new node from 1 bit to 13 bits (a single bit more than half of the total string), while the MSS takes the remaining part. During duplicate address detection stage, the new node inserts the LSS into the payload field of the NS message and multicasts it to the all-node multicast address, which would be received by all nodes on the local link. All nodes whose last part of their LLAs matches with the LSS respond with NAs that include their LLAs.

The new node constructs a list of the respondent nodes alongside their IPv6 addresses (LLAs) and tries to see if its IP address is in the list. If not, the new node considers its address unique and goes on using its address. If the new node's address is found in this list, however, the new node forms another address by first randomly picking any MSS string from the possible $2^{24-m}$ MSS string combinations (m is the number of bits in the LSS), and then concatenating the chosen MSS string with the used LSS. This combination guarantees that a different link-local address is formed. The new node goes through the duplicate address detection again with the new address. For our work, we considered cases where m, the number of bits in the LSS string, is varied from 1 to 13.

However, if there is a match between the LLA of the new node and that of a responding node, the new node proceeds to generate another address choosing any one of the remaining $2^{24-m}$ potential addresses (m is number of bits in the LSS), concatenating it with its LSS. This new combination would be the last 24 bits of its LLA, and should be unique. So the new node goes through the Duplicate Address Detection process again.

TABLE 5

Proposed Trust Algorithm 2 (MSS/LSS)
ACTION

// Input: {new node's LLA, a set of random IPv6 neighbor peers, LSSs of the last 24 bits of peers' LLAs}
// Output: {list of LLAs of responding nodes, new node's decision to use address}
1. New node forms an LLA
2. The new node extracts the last 24 bits of its LLA and divides it into MSS and LSS
3. The new node constructs an NS and multicasts it to all the nodes on the link, encapsulating the LSS inside the payload of the NS
4. All existing nodes with a match with the LSS of the new node will respond with an NA message including their LLAs within their respective NA payloads.
5. New node searches from list of respondent addresses to check for a match with its LLA.
6.     If no match
        Address is considered unique and new node joins the network with this LLA
7.     Else
        a. Selects a new LSS from the pool of remainder addresses (i.e., from the remaining $2^{24-m}$ addresses), where m = Number of intended LSS bits, defined at network initialization time.
        b. Constructs a new LLA based on the new LSS.
        c. Go to Step 3.
8. End The MSS/LSS embodiment of the present authentication method for stateless address allocation in IPv6 networks is demonstrated with a simple IPv6 network of random peer nodes in which a new node with a link-local address of fe80:: 0212:6bff:fe3a:9e9a attempts to join the network. The last 6 hex letters of the new node '3a9e9a' correspond to '001110101001111010011010' divided into binary strings of MSS and LSS. The number of bits inside the LSS sting is varied by the new node from 1 bit to 13 bits (just a bit more than half of the total string), while the MSS takes the remaining part. During duplicate address detection stage, the new node inserts the LSS into the payload field of the NS message and multicasts it to the all-node multicast address which would be received by all nodes on the local link. All nodes whose last part of their LLAs matching with the LSS respond with NAs including their LLAs.

The new node constructs a list of the respondent peers alongside their IPv6 addresses (LLAs) and tries to see if its IP address is in the list. If not, the new node considers its address unique and goes on using its address. If the new node's address is found in this list however, the new node forms another address by first randomly picking any MSS string from the possible $2^{24-m}$ MSS string combinations (m is the number of bits in the LSS) and then concatenating the chosen MSS string with the used LSS. This combination guarantees that a different link-local address is formed. The new node goes through the duplicate address detection again with the new address.

Cases were considered where m, the number of bits in the LSS string is varied from 1 to 13, and equally perform a simulation with random set of IPv6 neighbor peers on the local link with the new nodes.

To test the performance of the proposed scheme for detection of duplicate addresses, and to verify the correctness of all NA responses received by a new node, the scheme needs to be analyzed in the context of varying network and application parameters. The parameters listed in Table 6 affect the performance of the scheme.

TABLE 6

Affected Parameters MSS/LSS scheme

| Parameter | Definition |
| --- | --- |
| N | The total number of nodes in the network. |
| y | The number of legitimate nodes in the network. |
| K = N − y | The number of rogue nodes. |
| L | The number of LSS bits used. |
| α | The number of responses. |
| τ | Time window (duration) between neighbor solicitation and neighbor advertisement. |

The number of legitimate nodes in the network, y, is a system parameter that is varied for analysis of the scheme under the presence of diverse adversarial classes. For instance, a network that has witnessed a large number of recent malicious attacks, in particular, duplicate address attacks, will have a lower value of y, as opposed to networks with infrequent attack instances. The size of the network is defined as the total number of nodes operational in the network at any point in time. The analysis of the scheme may generate outcomes that are directly affected by the size of the network. We do not consider the topological aspects of the network, but rather assume that the IPv6 network is constituted of nodes that are reachable by any new node intending to join the network.

K is defined as the number of rogue nodes in the network. This value is simply a difference between the total number of nodes in the network and the number of legitimate nodes. L is the number of LSS bits employed by the new node in the payload of the NS message. This has an impact on the number of NA responses a, from the existing nodes inside the network.

The total number of responses received, i.e., the total number of NAs, to an NS of a new node is represented through α.

This TTD is the delay that the system can tolerate for the convergence of the entire detection scheme. If the delay exceeds W, then the advantage of detecting is overshadowed by the overhead that the scheme will incur. If the delay is less than W, then the scheme is efficient enough to perform the detection in order to be of value to the purpose, i.e., attack detection.

The total tolerable delay for the MSS/LSS scheme is given as:

$$W = \frac{(N-y) \cdot L}{\tau + \tau \alpha N} \quad (5)$$

If the total number of rogue nodes (hypothetically) is large, then the delay will be high, as it is anticipated that in the duplicate address attack, most if not all rogue nodes will respond to the NS with an NA. On the contrary, if K is small, then the effective delay will be low. Second, for large values of L, the expected number of responses will be low, since fewer nodes will be have an address overlapping with that of the new node in this case. If the value of L is small, then more nodes will have bit sequences in their respective addresses overlapping with the new node's address. In such a scenario, the total number of responses to the NS will be high. Therefore, the overall delay will be high. The length of the time window ($\tau$) is inversely proportional to the number of rogue nodes in the network, as well as to the length of the LSS. An increasing number of responses to the NS will incur higher delays, as opposed to receiving fewer responses. Therefore, an increasing value of $\alpha$ will have a non-decreasing effect on the overall delay of the scheme. The larger the network, the greater will be the expected number of NA responses to a given NS. The length of the time window is directly proportional to the values of both N and $\alpha$. When Equation (5) is differentiated with respect to $\tau$, Equation (6) best describes an expression for the minimum time window within which a neighbor advertisement response is expected to a neighbor solicitation is sent:

$$\tau = \sqrt{\frac{N\alpha}{KL}} \quad (6)$$

Figure 13:
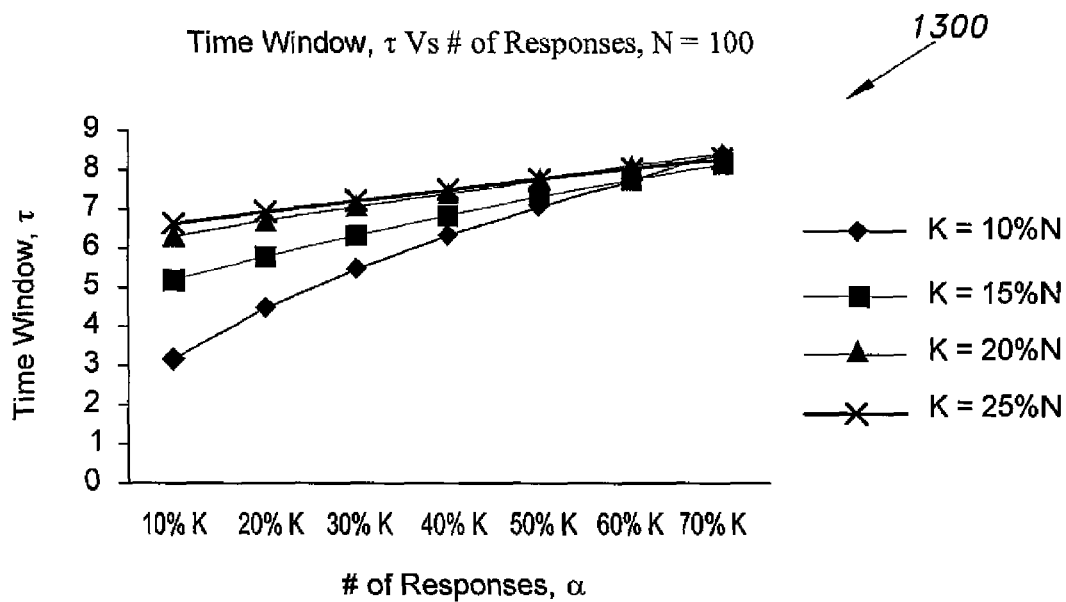
FIG. 13 is a plot showing time window vs. number of responses with N=100 in an authentication method for stateless address allocation in IPv6 networks according to the present invention.

The plot 1300 in FIG. 13 depicts a network configuration of 100 nodes with several compositions of malicious nodes. In this scenario, percentages of malicious nodes to total network size were varied from 10% to 25%.

A new node joining the network with a neighbor solicitation message multicast on the local link experiences some time delays of the order of $\tau$ (in microsecond) before it receives neighbor advertisement messages from the nodes claiming the ownership of the new node's link-local address. With a number of malicious nodes inside the network, the amount of neighbor advertisement messages received by the new nodes are measured as a percentage of the total network size.

The impact of the increasing proportion of malicious nodes is felt on the time window length. If the whole network is constituted of 10% malicious nodes as in FIG. 13, the time window length experienced by a new node between its neighbor solicitation and neighbor advertisement response(s) is about 3 µs. The new node collects all the neighbor advertisement message responses and compares its address with those of claiming nodes. If the network contains 25% malicious nodes, the time window experienced by the new node is 8 µs.

Figure 14:
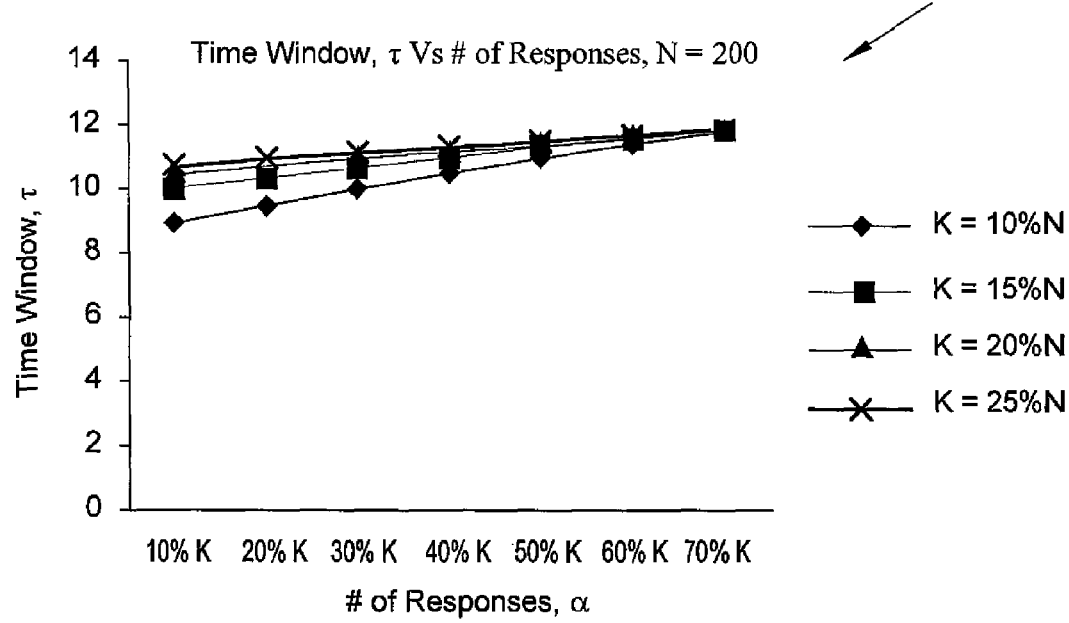
FIG. 14 is a plot showing time window vs. number of responses with N=200 in an authentication method for stateless address allocation in IPv6 networks according to the present invention.
Figure 15:
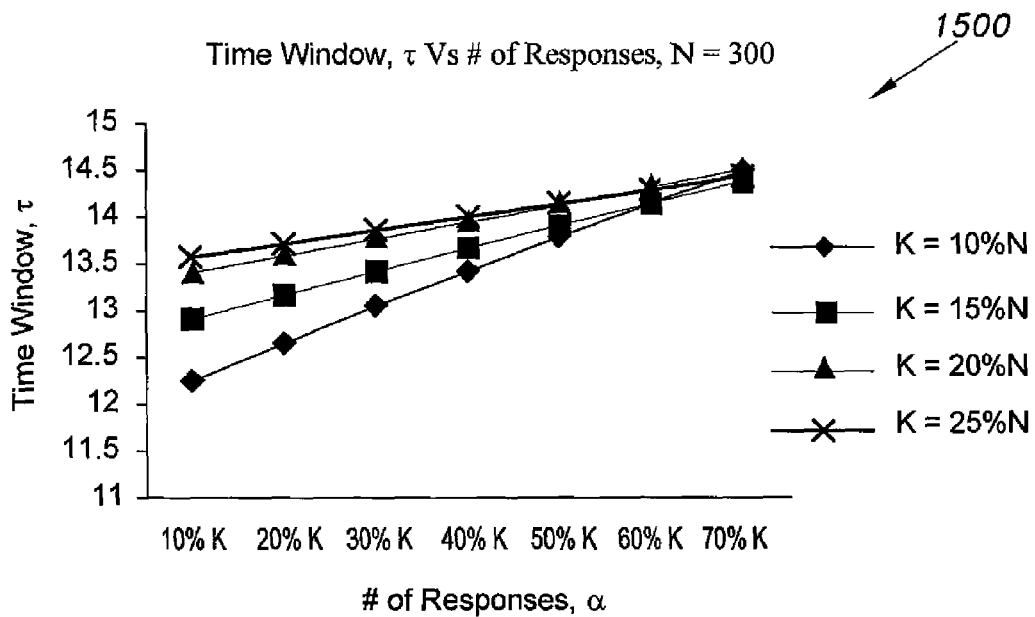
FIG. 15 is a plot showing time window vs. number of responses with N=300 in an authentication method for stateless address allocation in IPv6 networks according to the present invention.
Figure 16:
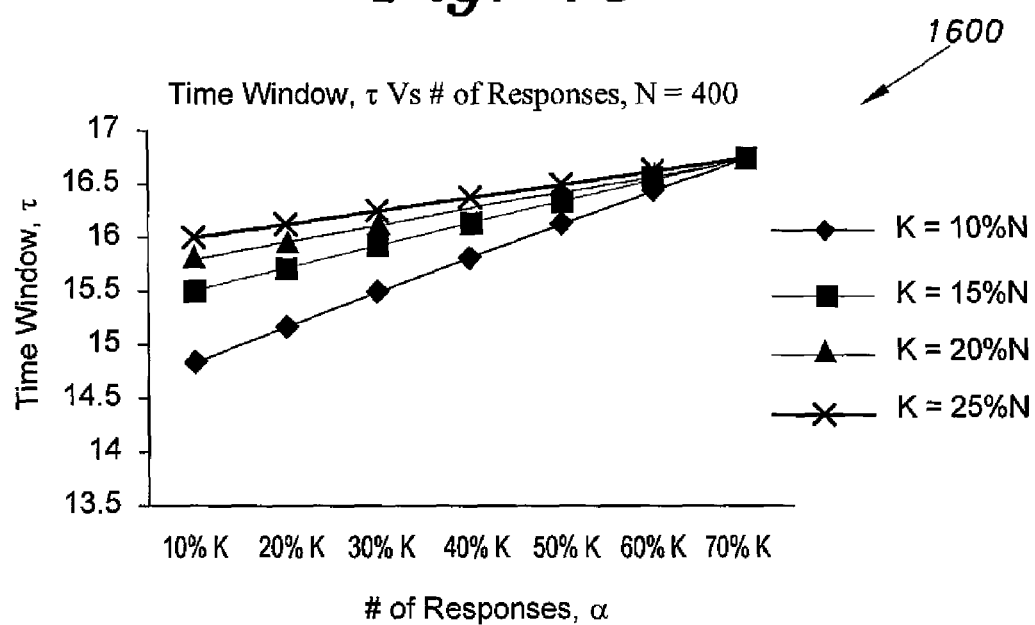
FIG. 16 is a plot showing time window vs. number of responses with N=400 in an authentication method for stateless address allocation in IPv6 networks according to the present invention.
Figure 17:
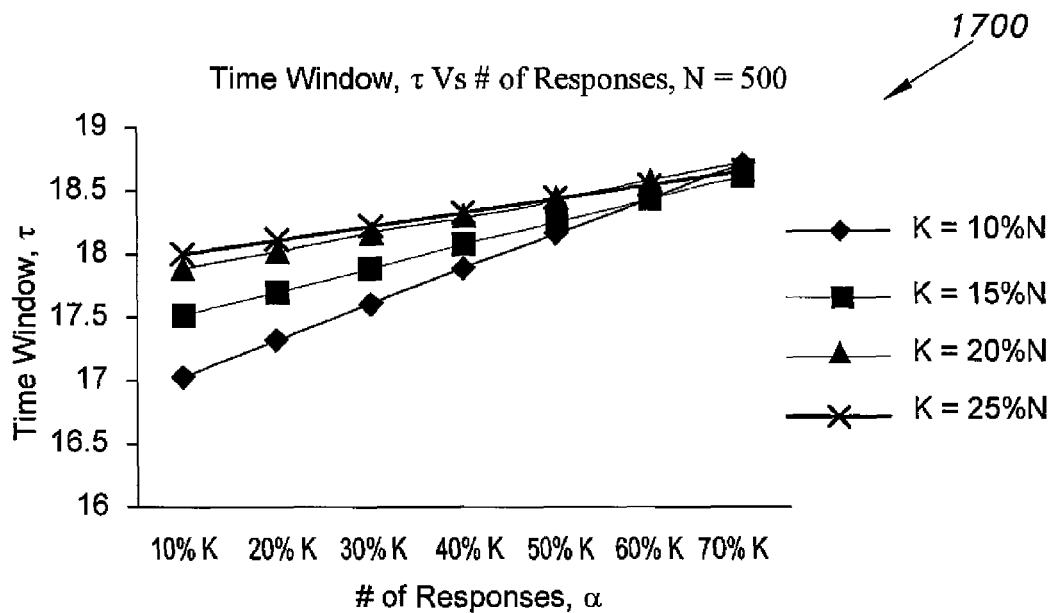
FIG. 17 is a plot showing time window vs. number of responses with N=500 in an authentication method for stateless address allocation in IPv6 networks according to the present invention.
Figure 18:
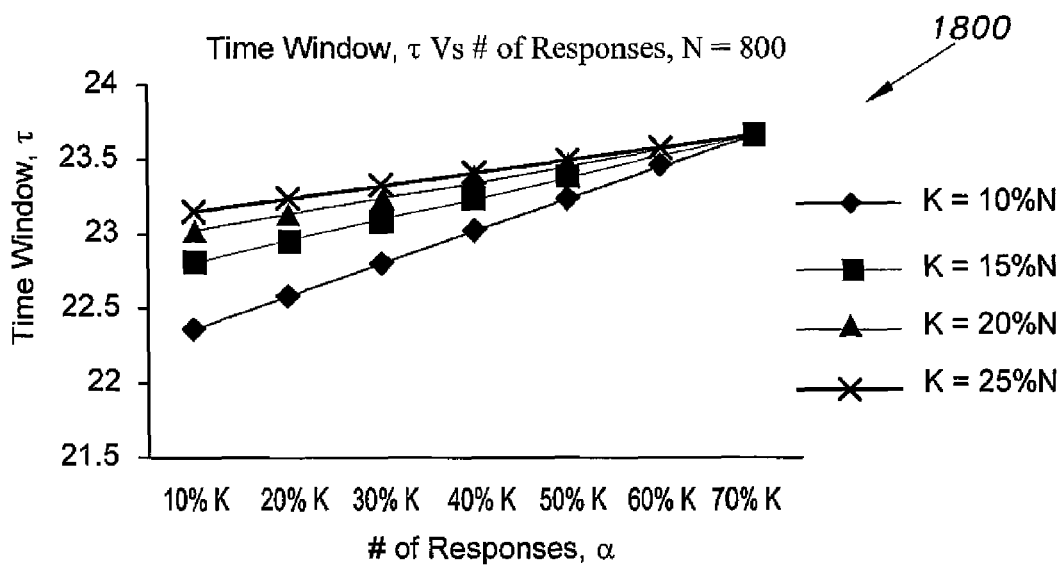
FIG. 18 is a plot showing time window vs. number of responses with N=800 in an authentication method for stateless address allocation in IPv6 networks according to the present invention.

The plot 1400 of FIG. 14 shows a 200-node network. Since it is a larger network than that shown in plot 1300, and consequently has a greater number of malicious nodes, a new node joining this network experiences a delay of 8.5 µs when there are only 10% of the neighbor advertisement responses are coming from the malicious nodes. With a greater percentage of the total network size being constituted by malicious nodes, and hence a greater number of responses coming from malicious nodes, the delays increase. In addition, it took a longer time for the network to converge. A similar pattern is observed for a network size of 300, as shown in plot 1500 of FIG. 15, a network size of 400, as shown in plot 1600 of FIG. 16, a network size of 500, as shown in plot 1700 of FIG. 17, and a network size of 800, as shown in plot 1800 of FIG. 18. With more nodes in the network, the new node has a corresponding number of neighbor advertisement messages to process from both legitimate nodes and malicious nodes after sending its neighbor solicitation request on the local link.

Figure 19:
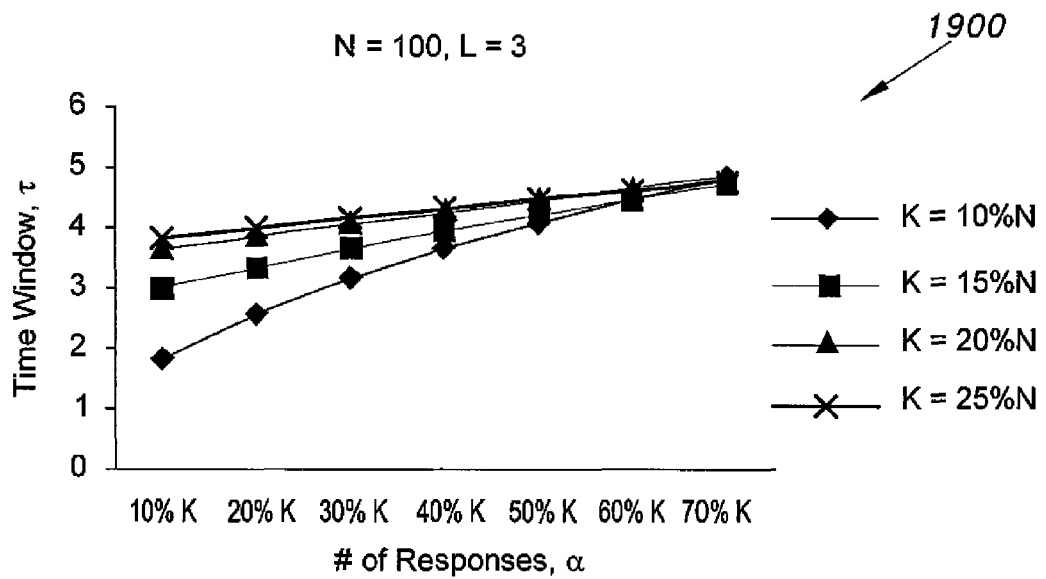
FIG. 19 is a plot showing time window vs. number of responses with N=100, L=3 in an authentication method for stateless address allocation in IPv6 networks according to the present invention.

However, when the new node uses a higher number of LSS bits in the neighbor solicitation message, this impacts on the time window and the time it takes for the scheme to converge. For example, when the LSS bits used in the neighbor solicitation request message is increased to 3 and the network size is 100, as shown in plot 1900 of FIG. 19, there is a great reduction in the time window to about 1.8 µs, as opposed to 3 µs in FIG. 13, when 10% of the total network is constituted by a malicious node.

Figure 20:
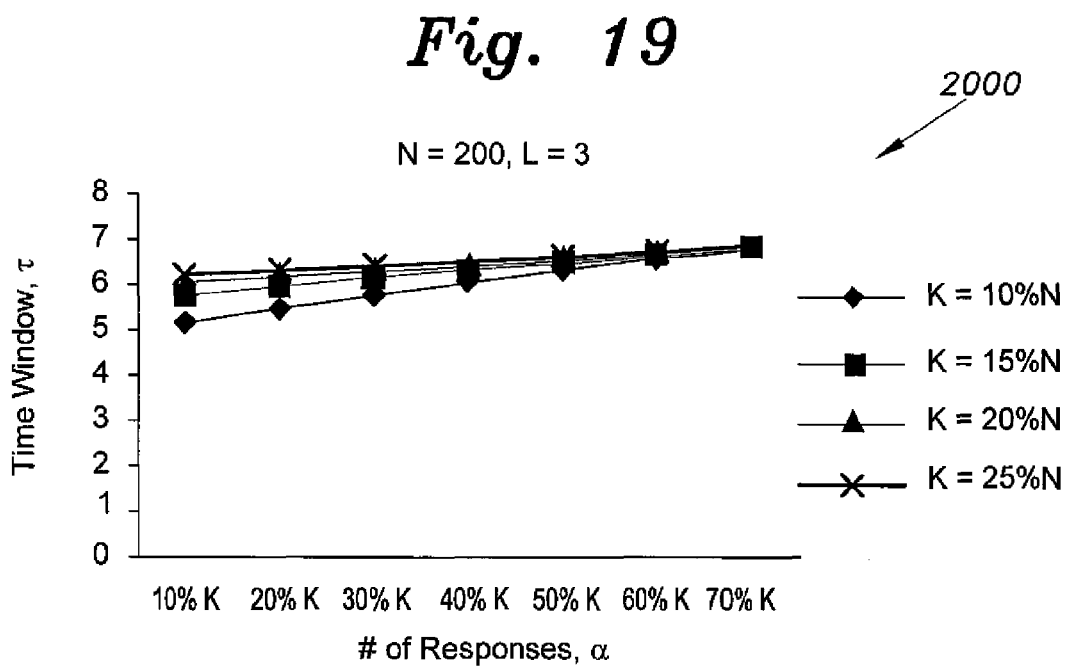
FIG. 20 is a plot showing time window vs. number of responses with N=200, L=3 in an authentication method for stateless address allocation in IPv6 networks according to the present invention.
Figure 21:
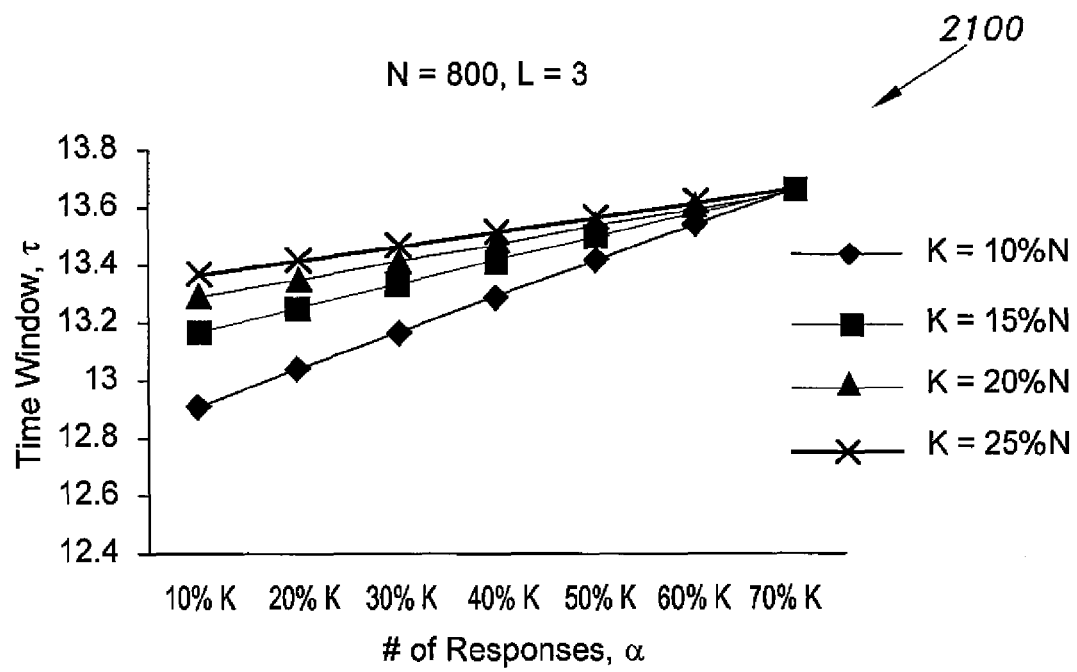
FIG. 21 is a plot showing time window vs. number of responses with N=800, L=3 in an authentication method for stateless address allocation in IPv6 networks according to the present invention.

A similar trend is also obtained in other network configurations, e.g., the 200 node plot 2000 shown in FIG. 20. If the new node uses 3 LSS bits in an 800-node size network as depicted in plot 2100 of FIG. 21, the minimum delay experienced by the new node when 25% of total network nodes are malicious is about 13.4 µs. Compared to 23.1 µs in plot 1700 of FIG. 17, the delay is much more reduced. With a greater number of LSS bits, the number of IP address matches of the new node with those of existing nodes is far less. This also leads to a smaller number of neighbor advertisement responses from existing nodes, which translates to less overhead on the network.

Besides the fact that the proposed MSS/LSS scheme is effective in verifying the claim of responding peers when a new node in an IPv6 network is undergoing the duplicate address detection, which helps prevent a denial of service, the benefit of this technique also lies in the fact that it helps to reduce the overhead, as the number of responses keeps decreasing to zero when a higher number of LSS bits is employed.

It is a powerful means by which a new node can authenticate the claims of other peer nodes without revealing the information it is attempting to verify.

The main focus of the novel authentication method is to provide techniques that would prevent malicious nodes from denying a legitimate node in initializing its interface when joining an IPv6 network.

Two approaches were proposed. The first approach is a reputation-based technique that involves the determination of aggregate trust of nodes inside a network. The aggregate trust is calculated from the neighbors of every node inside the network, and it is included inside the neighbor advertisement that a joining node receives in response to its neighbor solicitation message sent to the k neighbors of the malicious node. This scheme, however, assumes that each node inside the network is surrounded by some random trustworthy k neighbors from which the aggregate trust of a node is determined.

The second approach is the MSS/LSS scheme, which uses an information hiding concept to verify the claim of a malicious node. In this scheme, the joining node only discloses some of its features, using the LSS inside the payload of its neighbor solicitation message, and requests any nodes that have the LSS match to send their full IPv6 addresses inside their neighbor advertisement messages.

While the reputation scheme may fail based on the assumption that every node has some k trustworthy random neighbors, an assumption that may not hold all the time, especially if some of the neighbor nodes later become malicious, the second scheme is not constrained by this shortcoming.

In all simulation scenarios in the MSS/LSS scheme, no node inside the network is aware of the link-local address of the joining node, and for this reason it is difficult for any malicious node to spoof the joining node's address. In addition, simulation results also showed that there were no responses to a joining node's neighbor solicitation message request before some 30% of the LSS bits are used for authentication. And even in a very rare case of any response, the joining node can still choose any MSS bit stream out of $2^{24-m}$ space (m is the number of LSS bits), concatenate it with the LSS bit stream, and go through the duplicate address detection process again. The present method prevents malicious nodes from denying a legitimate node in initializing its interface when joining an IPv6 network.

It is to be understood that the present invention is not limited to the embodiments described above, but encompasses any and all embodiments within the scope of the following claims.

We claim:

1. A computer software product, comprising a non-transitory medium readable by a processor, the non-transitory medium having stored thereon a set of instructions for a new node to perform an authentication method for stateless address allocation during a stateless address auto-configuration (SLAAC) sequence in IPv6 networks, the set of instructions including:

(a) a first sequence of instructions which, when executed by the processor, causes said processor to form a new node link-local address (LLA);

(b) a second sequence of instructions which, when executed by the processor, causes said processor to extract the last 24 bits of the new node LLA, dividing it into a Most Significant Segment (MSS) and a Least Significant Segment (LSS);

(c) a third sequence of instructions which, when executed by the processor, causes said processor to construct a neighbor solicitation (NS) message and multicast the NS to all nodes on a link of the IPv6 network, the LSS being encapsulated inside a payload of the NS;

(d) a fourth sequence of instructions which, when executed by the processor, causes said processor to receive neighbor advertisement (NA) messages from all existing nodes having a LSS matching the LSS of the new node, the NA message including the LLA of the existing node responding with the NA message, an existing neighbor's LLA residing in a payload portion of the NA message;

(e) a fifth sequence of instructions which, when executed by the processor, causes said processor to search from a list of the responding existing nodes for a match between the existing neighbor's LLA and the LLA of the new node;

(f) a sixth sequence of instructions which, when executed by the processor, causes said processor to join the network using the new node LLA when there is no match between the new node LLA and the LLA of the existing neighbor node; and (g) a seventh sequence of instructions which, when executed by the processor, causes said processor to select a new LSS from a pool of $2^{24-m}$ remainder addresses (m being a predetermined number of LSS bits defined at initialization time of the network), construct a new LLA based on the new LSS, and loop through the third through the seventh sequence of instructions until the new node has a unique new node LLA.

* * * * *